United States Patent
Cheng et al.

(10) Patent No.: US 9,338,521 B2
(45) Date of Patent: May 10, 2016

(54) OVERWRITING EXISTING MEDIA CONTENT WITH VIEWER-SPECIFIC ADVERTISEMENTS

(71) Applicant: Microsoft Technology Licensing, LLC, Redmond, WA (US)

(72) Inventors: Raymond Cheng, Sammamish, WA (US); Ning Lin, Redmond, WA (US); Pu Su, Redmond, WA (US); Vishal Sood, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 343 days.

(21) Appl. No.: 13/774,661

(22) Filed: Feb. 22, 2013

(65) Prior Publication Data

US 2014/0245346 A1  Aug. 28, 2014

(51) Int. Cl.
*H04N 21/81* (2011.01)
*H04N 21/234* (2011.01)
*H04N 21/262* (2011.01)
*H04N 21/845* (2011.01)
*H04N 21/2668* (2011.01)
*H04N 21/482* (2011.01)

(52) U.S. Cl.
CPC ....... *H04N 21/812* (2013.01); *H04N 21/23424* (2013.01); *H04N 21/2668* (2013.01); *H04N 21/26258* (2013.01); *H04N 21/4825* (2013.01); *H04N 21/8456* (2013.01)

(58) Field of Classification Search
CPC .......... H04N 21/812; H04N 21/23424; H04N 21/2668; H04N 21/23418; H04N 21/26258; H04N 21/2393; H04N 21/8547; H04N 21/8586; H04N 21/4825; H04N 21/6587
See application file for complete search history.

(56) References Cited

U.S. PATENT DOCUMENTS

| | | | |
|---|---|---|---|
| 8,234,350 B1 * | 7/2012 | Gu et al. | 725/86 |
| 8,495,675 B1 * | 7/2013 | Philpott et al. | 725/34 |
| 9,066,115 B1 * | 6/2015 | Cherry et al. | |
| 2007/0204310 A1 | 8/2007 | Hua et al. | |
| 2009/0019471 A1 | 1/2009 | Rabinovitch et al. | |
| 2009/0307722 A1 | 12/2009 | Gross | |

(Continued)

OTHER PUBLICATIONS

Windows Media—"Windows Media Services" 2007 Microsoft Corporation.*

(Continued)

*Primary Examiner* — Hai V Tran
(74) *Attorney, Agent, or Firm* — Ben Tabor; Doug Barker; Micky Minhas

(57) ABSTRACT

Embodiments are directed to pacing on-demand linear advertisement entries to appear as being live entries, to generating a sequential segment map from a parallel playlist and to consolidating linear ad and main content portions into a single linear chunklist. In one embodiment, a computer system receives video content updates for a portion of live video programming, and generates a parallel playlist with parallel playlist entries that identify a presentation that is to be played. The computer system then generates a sequential segment map from the parallel playlist that identifies which parallel playlist entry is to be played, monitors a live position for new media, determines that an on-demand linear advertisement is to be played at the live position, and appends on-demand linear advertisement chunks to a chunklist to replace the main content chunks and play the on-demand linear advertisement entries in a pseudo-live format as if they were live.

20 Claims, 6 Drawing Sheets

(56) References Cited

U.S. PATENT DOCUMENTS

| | | | |
|---|---|---|---|
| 2009/0320063 A1 | 12/2009 | Barrett | |
| 2010/0189131 A1 | 7/2010 | Branam et al. | |
| 2010/0251289 A1 | 9/2010 | Agarwal et al. | |
| 2011/0307623 A1* | 12/2011 | George et al. | 709/231 |
| 2011/0307781 A1 | 12/2011 | Sood et al. | |
| 2012/0047542 A1* | 2/2012 | Lewis et al. | 725/97 |
| 2012/0099022 A1 | 4/2012 | Sundy et al. | |
| 2014/0150019 A1* | 5/2014 | Ma et al. | 725/34 |
| 2014/0230003 A1* | 8/2014 | Ma et al. | 725/115 |

OTHER PUBLICATIONS

Islam, MD. Safiqul, "A HTTP Streaming Video Server with Dynamic Advertisement Splicing", Published on: Mar. 21, 2010, Available at: http://web.it.kth.se/~maguire/DEGREE-PROJECT-REPORTS/100409-Md.__Safiqul_Islam-with-cover.pdf.

"Spectrum", Retrieved on: Oct. 17, 2012, Available at: http://www.seawellnetworks.com/wp-content/uploads/2012/05/SeaWell-Spectrum2.0-Product-Sheet_updated.pdf.

* cited by examiner

OVERWRITING EXISTING MEDIA CONTENT WITH VIEWER-SPECIFIC ADVERTISEMENTS

BACKGROUND

Television shows, movies and other forms of media are increasingly transferred on demand to consumers. These shows are often pre-recorded, but may also include live broadcasts. Each type of content (both on-demand and live) may be streamed to media consumers. The media may be streamed to a variety of different devices including laptops, tablets, smart phones and other computing devices.

In order to monetize this streamed content, media producers typically insert advertisements for viewing by the user. These advertisements may be provided at a national level by national advertisers or at a regional level by regional advertisers. In some cases, the advertisements may be "linear advertisements", which are embedded in the content stream and do not require special processing for playback. These linear advertisements have many applications, but only allow for minor customization, and that only on a regional level.

BRIEF SUMMARY

Embodiments described herein are directed to pacing on-demand linear advertisement entries to appear as being live entries, to generating a sequential segment map from a parallel playlist and to consolidating linear ad and main content portions into a single linear chunklist. In one embodiment, a computer system receives video content updates for a portion of live video programming. The live video programming includes both main content entries and on-demand linear advertisement entries that are played according to an advertising schedule. The computer system generates a parallel playlist that includes various parallel playlist entries. Each parallel playlist entry identifies a presentation that is to be played at a specified point on a linear timeline. The presentation includes a main content entry and/or an on-demand advertisement entry.

The computer system then generates a sequential segment map from the parallel playlist that identifies which parallel playlist entry is to be played at the current point in the linear timeline. The computer system monitors a live position to determine that at least one new portion of main content main content media has become available. The computer system then determines that an on-demand linear advertisement is to be played at the live position and appends one or more corresponding on-demand linear advertisement chunks to a chunklist to replace the main content chunks. As such, the on-demand linear advertisement entries are played in a pseudo-live format as if they were live.

In another embodiment, a computer system accesses a parallel playlist that includes multiple parallel playlist entries. The parallel playlist entries identify a presentation that is to be played at a specified point on a linear timeline. The parallel playlist entries are ordered in increasing priority. The computer system creates a sequential segment map entry for each parallel playlist entry, where each parallel playlist entry is scheduled to play at a specified time indicated on a linear insertion timestamp for a specified duration. The computer system inserts each sequential map entry into a sequential segment map according to the sequential segment map entry's associated linear insertion timestamp. The computer system then overlays the sequential segment map entries on top of the existing sequential segment map entries in the sequential segment map to determine where overlaps exist between sequential segment map entries, resolves any determined sequential segment map entry overlaps to ensure that a single parallel playlist entry is played at the specified time indicated on the linear insertion timestamp, and sends the sequential segment map to a video player for playback according to the resolved insertion order of the sequential map entries.

In yet another embodiment, a computer system consolidates linear ad and main content portions into a single linear chunklist. The computer system accesses a media chunk manifest which describes how to download media chunks for playback. The media chunks include main content chunks and/or linear advertisement chunks. The computer system adds media chunks from the media chunk manifests to a chunklist so that main content media chunks are overwritten upon determining that a linear advertisement is to be played at that time. Each chunklist entry is also extended to include its own splice-in and splice-out information. The computer system then determines a splice-in boundary and a splice-out boundary for a linear advertisement that is to be inserted into the chunklist, adds a splice-in boundary marker to the splice-in boundary and a splice-out boundary marker to the splice-out boundary, and generates a single linear chunklist that includes media chunks from multiple different manifests. As such, the single linear chunklist is playable by a media player.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
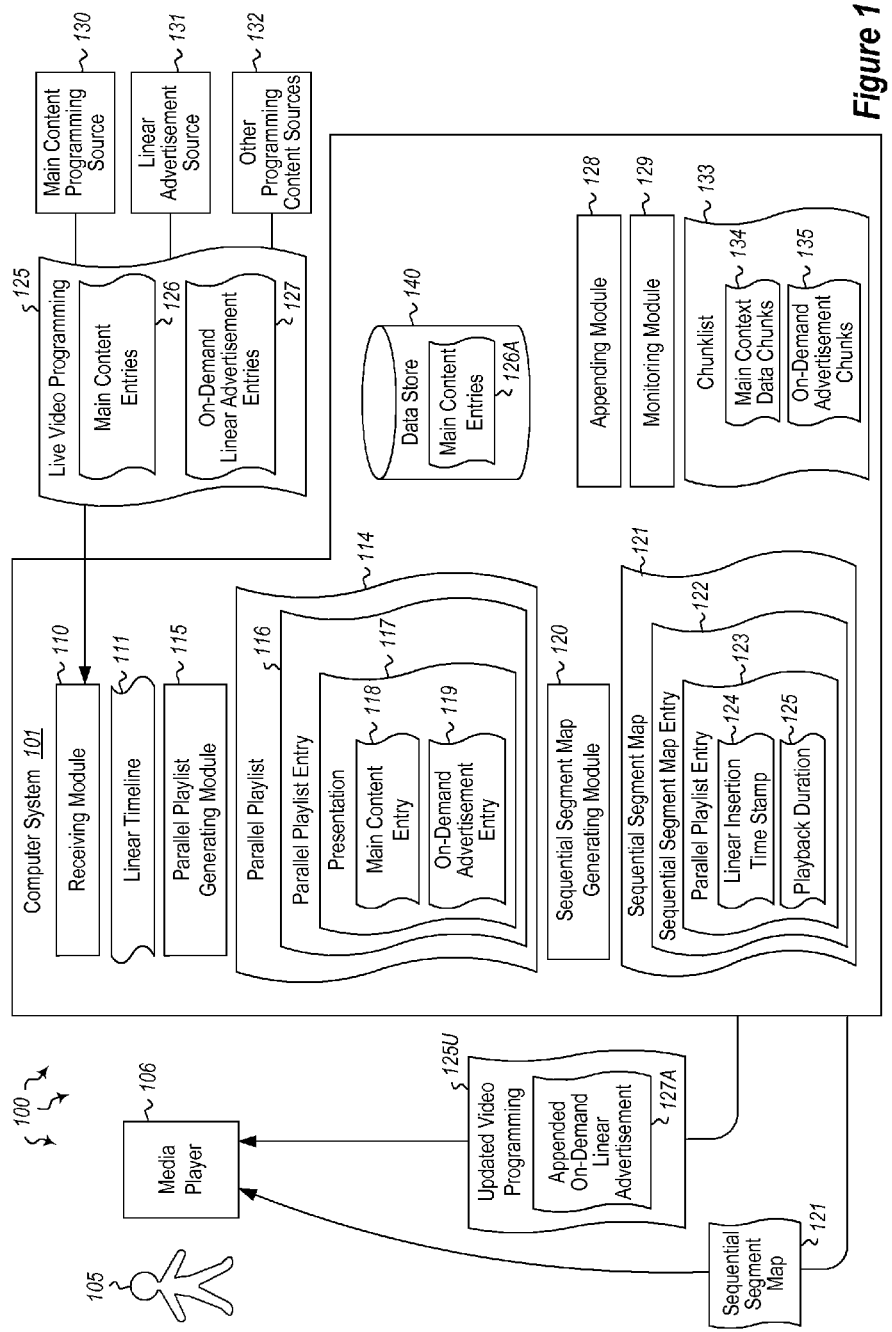
FIG. 1 illustrates a computer architecture in which embodiments described herein may operate including pacing on-demand linear advertisement entries to appear as being live entries.

Embodiments described herein are directed to pacing on-demand linear advertisement entries to appear as being live entries, to generating a sequential segment map from a parallel playlist and to consolidating linear ad and main content portions into a single linear chunklist. In one embodiment, a computer system receives video content updates for a portion of live video programming. The live video programming includes both main content entries and on-demand linear advertisement entries that are played according to an advertising schedule. The computer system generates a parallel playlist that includes various parallel playlist entries. Each parallel playlist entry identifies a presentation that is to be played at a specified point on a linear timeline. The presentation includes a main content entry and/or an on-demand advertisement entry.

The computer system then generates a sequential segment map from the parallel playlist that identifies which parallel playlist entry is to be played at the current point in the linear timeline. The computer system monitors a live position to determine that at least one new portion of main content main content media has become available. The computer system then determines that an on-demand linear advertisement is to be played at the live position and appends one or more corresponding on-demand linear advertisement chunks to a chunklist to replace the main content chunks. As such, the on-demand linear advertisement entries are played in a pseudo-live format as if they were live.

In another embodiment, a computer system accesses a parallel playlist that includes multiple parallel playlist entries. The parallel playlist entries identify a presentation that is to be played at a specified point on a linear timeline. The parallel playlist entries are ordered in increasing priority. The computer system creates a sequential segment map entry for each parallel playlist entry, where each parallel playlist entry is scheduled to play at a specified time indicated on a linear insertion timestamp for a specified duration. The computer system inserts each sequential map entry into a sequential segment map according to the sequential segment map entry's associated linear insertion timestamp. The computer system then overlays the sequential segment map entries on top of the existing sequential segment map entries in the sequential segment map to determine where overlaps exist between sequential segment map entries, resolves any determined sequential segment map entry overlaps to ensure that a single parallel playlist entry is played at the specified time indicated on the linear insertion timestamp, and sends the sequential segment map to a video player for playback according to the resolved insertion order of the sequential map entries.

In yet another embodiment, a computer system consolidates linear ad and main content portions into a single linear chunklist. The computer system accesses a media chunk manifest which describes how to download media chunks for playback. The media chunks include main content chunks and/or linear advertisement chunks. The computer system adds media chunks from the media chunk manifests to a chunklist so that main content media chunks are overwritten upon determining that a linear advertisement is to be played at that time. Each chunklist entry is also extended to include its own splice-in and splice-out information. The computer system then determines a splice-in boundary and a splice-out boundary for a linear advertisement that is to be inserted into the chunklist, adds a splice-in boundary marker to the splice-in boundary and a splice-out boundary marker to the splice-out boundary, and generates a single linear chunklist that includes media chunks from multiple different manifests. As such, the single linear chunklist is playable by a media player.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. These modules can perform function such as dynamic scheduling and playback of linear advertisements on a per-client basis. "Linear advertisements," as the term is used herein, are advertisements which are embedded in a content stream (e.g. a web or television stream) and do not require any special processing for playback. The various modules of computer system 101 allow for linear ads inserted upstream (either at the national or regional level) to be replaced with ads which target a specific user, in both live and on-demand video content. The user-specific ads may be inserted in such a manner that they appear to be embedded (meaning that fast-forward and rewind do not appear to be any different than before), and only use a single playback element. User-specific ads may also be scheduled over the top of future content which has not yet been produced.

Linear advertisements are advertisements which overwrite or replace main content (e.g. a television program or web video). Typically, the main content (e.g. 126) which is replaced with a linear ad (e.g. 127) is space which has been specifically reserved for advertisements. The main content being replaced may therefore be a "slate" which serves to create space which is reserved for the advertisement, or may be linear advertisements which were inserted upstream at a national or regional level. As mentioned above, embodiments described herein allow for the scheduling of linear advertisements on an individual, user-specific level (e.g. scheduling ads for user 105).

Figure 5:
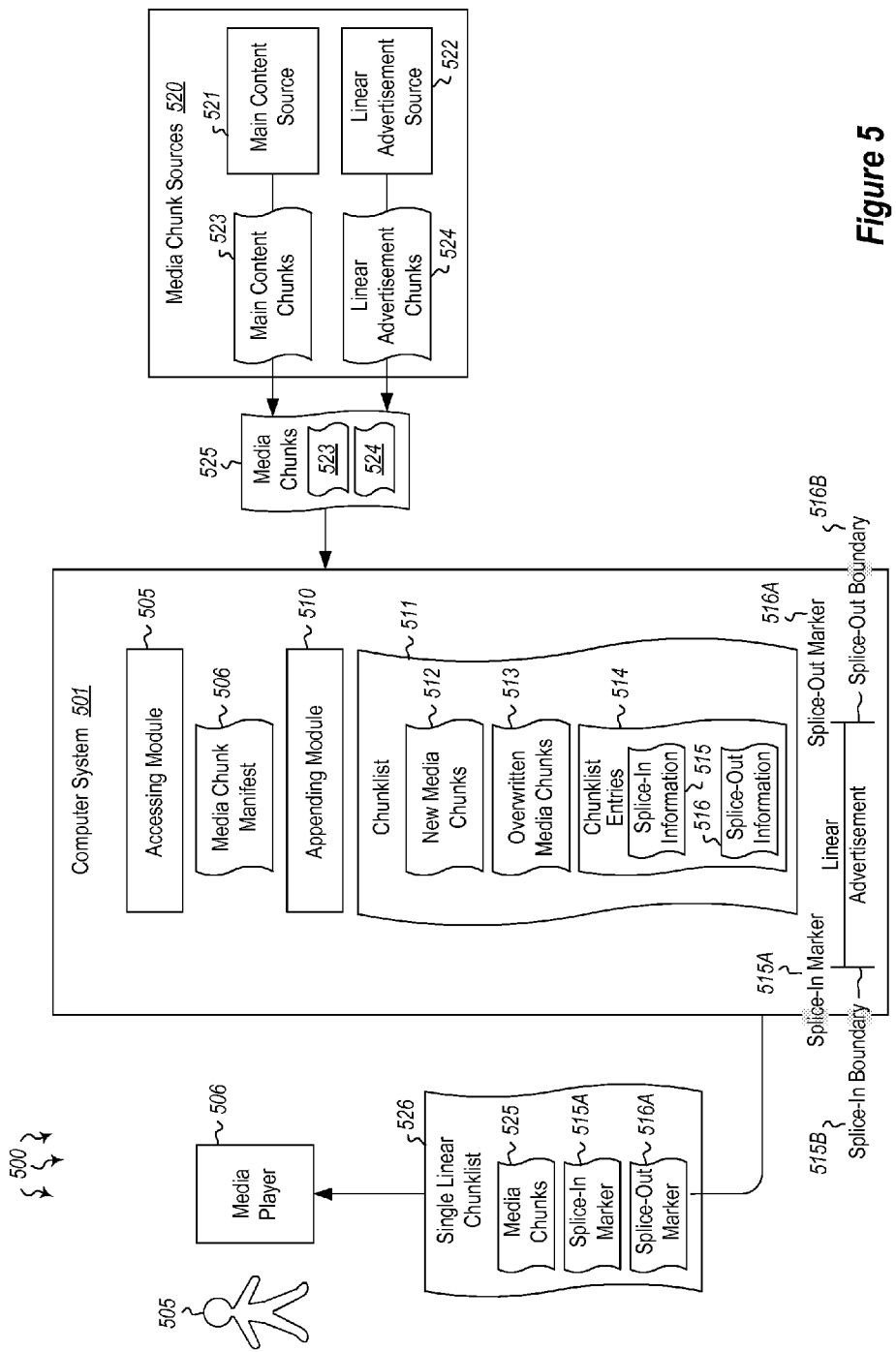
FIG. 5 illustrates a computing environment in which a sequential segment map is established and implemented.

"Adaptive streaming," as the term is used herein, refers to a method of streaming media which splits a media stream into, for example, two-second chunks. Under normal playback circumstances, in the absence of linear advertisements, the video player (e.g. 106) keeps a list of media chunks which are available for download. This list is referred to as the "chunklist" (e.g. 511 of FIG. 5). When streaming live media, the chunklist may be updated continuously over time. The chunklist is used to download media chunks which are sent to the user's video player 106. Consecutive chunks may be de-multiplexed into samples and fed to a media pipeline with no further action necessary for continuous playback.

Figure 6A:
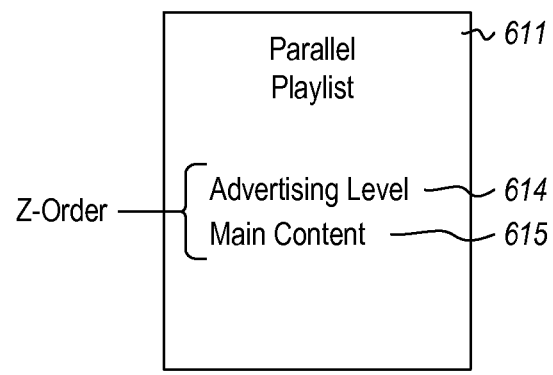
FIG. 6A illustrates various types of content arranged in Z-order within a parallel playlist.

Embodiments described herein represent the relationship between linear advertisements and main content through the use of a "parallel playlist" 114 with parallel playlist entries 116. The parallel playlist is a linear list of media presentations (e.g. 117) and a declaration of linear insertion time 124 and duration 125. The list is ordered in increasing priority (e.g. in Z-order, as shown in FIG. 6A), so that the last media presentation will overwrite any media presentations which come before it (e.g. Advertisement level 614 and the main content 615). The main content is placed first (or lowest) in the parallel playlist, so that it does not override other content, and instead is itself overridden. Linear advertisements are placed in the second and subsequent position, in the order that they were scheduled. Note that each entry in the list (which represents a media presentation) may itself be a parallel playlist. Thus the structure is recursive.

Figure 6B:
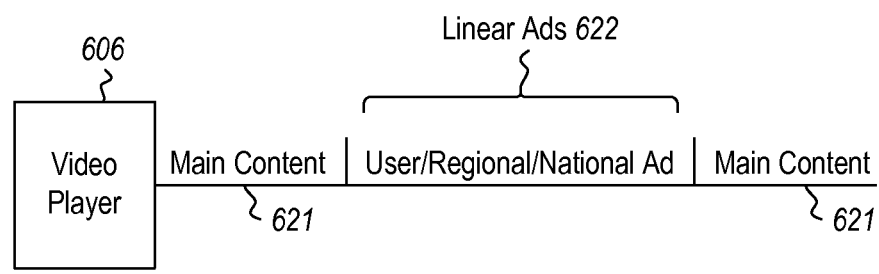
FIG. 6B illustrates a stream of content of various types being fed to a video player.

The main content will thus be played unless or until it is overwritten by a linear ad (at some level). The actual content stream (whether main content or a linear ad, as shown in FIG. 6B) is taken from a sequential segment map 121 that places each media chunk in order for playback. Some media players may use a sequential segment map 121 directly to buffer and play content. Some embodiments, on the other hand, may implement a method of adapting the sequential segment map so that it can be played by a player which does not understand linear ad splicing. Adaptive streaming players which are not aware of linear ad splicing may use a single chunklist to describe the media fragments that can be downloaded (e.g. chunklist 526 of FIG. 5).

Embodiments described herein may implement a number of different techniques to allow a single chunklist to represent both main content and linear advertisements, including techniques for executing playback of the consolidated chunklist (i.e. the sequential segment map 121). These techniques include: conversion from parallel playlist representation to sequential segment mapping (flattening), restriction of linear advertisement video tracks to fit within the playback range established by the main content video tracks, extension of media chunk definition to include splice-in and splice-out information (normal playback implementations do not contain such extensions), integration with non-linear-ad-aware media player (i.e. the use of the sequential segment map to overwrite media chunk entries in the chunklist so as to execute linear advertisement splicing), the use of markers and seek to execute a fast transition between main content and linear advertisements (as well as between linear advertisements), the detection of advertisement change overlapping with current playback and/or buffering position and the adjustment of playback to carry out the requested playback, and recovery to original content (main content) when unable to play scheduled linear advertisement through the use of backing store.

The above techniques allow for the playback of linear advertisements with on-demand content. When attempting to insert linear advertisements into live content, including cases where linear advertisements are inserted at a position in the future which has not yet occurred, embodiments described herein may be configured to hold back linear advertisement chunks (which are on-demand and therefore all available up-front) and synchronize to the live position of main content to pace (clock) the addition of linear advertisement chunks at the live position, thus simulating live streaming of on-demand content in a "fake live" manner.

In one scenario, a media player (e.g. 106 in FIG. 1) may be instructed to play the main presentation (live), say at http://maincontent. This causes a parallel playlist entry (e.g. 116) pointing to http://maincontent to be generated and placed at the start of the parallel playlist (lowest priority position—position 615 in FIG. 6A). The player retrieves a list of main content media entries 126 and records as one chunklist 526 per stream. Since, in this scenario, the main content is live content, buffering commences at the live position.

The media player 106 fetches linear ad times and URLs, and schedules the first linear advertisement (e.g. 127) to play http://Ad1, at a particular manifest timestamp of http://maincontent. This causes a parallel playlist entry (e.g. 116) to be added after the http://maincontent entry. The parallel playlist 114 is used to create a sequential segment map 121, which includes an ordered list of which presentations to play, and a declaration indicating where to start playback 124, and for how long 125. Content flattening, as mentioned above, ensures that an entry which appears later in the playlist will overwrite any entry which appears before it.

In order to flatten a parallel playlist 114 into a sequential segment map 121, one or more steps may be performed, including: 1) Start with an empty sequential segment map 121, which represents a linear timeline (as opposed to a manifest timeline). 2) For main content which is live, the duration of the sequential segment map entry is infinite. 3) For each parallel playlist entry, create a sequential segment map entry 122 which states that a given manifest, starting at a given manifest time, will be played at a particular linear timestamp, for a given duration. 4) Perform an ordered (sorted) insertion into the sequential segment map. 5) If either of the two adjacent sequential segment map entries overlap with the one currently being added, then truncate them so that no overlap occurs. In cases where the new sequential segment entry spans another entry in its entirety, the spanned entry is removed completely.

The sequential segment map entry is used to download the appropriate manifest 506 for a given buffering position. The manifest describes how to download the media chunks (523 and/or 524) for playback. Some media players may use the sequential segment map 121 directly. However, integration with some existing players (which are not aware of linear ad splicing) is also contemplated herein. For such non-aware players, manifests are downloaded up front so that a single chunklist may be constructed (e.g. sequential media chunks 525 which are sent to player 506), consisting of media chunks from a variety of manifests.

The chunklist may initially be populated with media chunks from the main content (as shown in FIG. 6B, main content chunks 621 are the first to reach the player 606. Then the sequential segment map 121 is iterated over and each manifest 506 is downloaded, and the appropriate media chunks from that manifest are added to the chunklist, overwriting main content media chunks (as shown in FIG. 6B where linear ads 622 (of either the national, regional or user level) are depicted as overriding the main content 621). Any media chunk which is overwritten is saved to a data store (e.g. 140) for later retrieval, in the event that the advertisement media is unavailable. As media chunk entries are added to the chunklist, if it straddles the start or end time of the current sequential segment map, then the chunklist entry will have its lead-in and/or lead-out times set accordingly. In any case, an offset may be set on the chunklist entry so that the manifest timestamps of linear advertisements are adjusted to match the main content manifest timestamps which are being overwritten by the linear ad (as will be described with regard to method 200 of FIG. 2 below).

Adaptive streaming allows the user/downloader 105 to choose among a number of bitrates when downloading any given media chunk. The downloader may, for example, choose a bitrate according to network conditions, playback capabilities, and/or a business model. For a given video stream, it is at this point that a restriction is imposed upon linear ad bitrates so that the downloaded chunk can be played using a media pipeline which has been initialized for a different presentation (the main content). The linear ad video tracks are examined and are removed from consideration if linear width exceeds main width, linear height exceeds main height, and in the case of H264, linear codec profile exceeds main codec profile, or linear codec level exceeds main codec level (as the linear ad codec matches the main content codec (VC-1 or H264)). Platform-specific limitations may also be applied at this stage, so if a video track which would normally be playable on other platforms would not be playable on the current platform, then it is excluded. Moreover, if none of the linear ad video tracks would be playable on the current platform, the linear ad contents would be ignored and the media player would naturally fall back to the main content playback.

After a media chunk has been downloaded and parsed, it is fed one sample at a time to the pipeline (and thus on to the user). The timestamp offset is applied to convert from linear ad manifest time to main content manifest time. The chunklist entry may specify a lead-in position (where rendering is to start) and a lead-out position (where rendering is to end). These instructions are conveyed using the method which is native to the media pipeline.

When a new linear advertisement boundary (splice-in and splice-out) is known, markers are added at the boundaries. A "marker," as the term is used herein, is a request to the media pipeline to fire an event when the playback position reaches the given timestamp. When the playback position reaches the marker, the event is fired, and the event handler responds by seeking to the current playback position (in other words, if a marker was set at time 10000, for example, and fires exactly when playback position is at 10000, then the marker event handler will issue a seek to 10000).

In response to this seek, media samples from the next manifest are fed to the pipeline. This is described herein as a "seek splice," where prior to the seek, the pipeline was being fed samples from manifest "A", and after the seek, the pipeline was being fed samples from manifest "B". The effect is a splice which is (substantially) seamless, as long as reasonable limits are set on the maximum lead-in time. It should be noted that this technique is designed for scenarios where the linear advertisements are known up-front. In some cases, however, linear ads may also be inserted while playback is in progress. If the linear ad overlaps with the buffering position, then buffering is aborted and the overlapped portion of the chunklist is deleted or "flushed." The downloader is reset to download from the new linear ad. If the linear ad also overlaps with the current playback position, then a seek to the current position may be issued to flush the media pipeline of stale samples. This will be explained further below with regard to method 400 of FIG. 4.

In some cases, the downloading of the linear ad manifest or its media chunks may fail. In such circumstances, the media player may make use of the data store 140/540 referenced earlier. The media player can undo the overwriting of main content and restore the main content media chunks 126, thus falling back to main content playback.

When live content is used (as opposed to on-demand content), additional steps may be implemented. First, when overwriting main content media chunks in the chunklist, it may be necessary to hold back linear advertisement media chunk entries 127 (which are on-demand, and therefore always available) if the underlying main content media chunk entry 126 will exist in the future, but does not exist yet. This ensures that the chunklist represents what can be downloaded right now, and does not contain chunks which do not exist yet.

Second, the introduction of linear advertisement media chunk entries into the chunklist is to be paced or clocked, so that the entries appear to be live, even though the linear advertisement is in fact on-demand. To achieve this, the system (e.g. 100 of FIG. 1) continues to subscribe to updates in main content using the technique which is native to the protocol. When the system becomes aware that a new main content media chunk has been published, instead of appending a main content media chunk entry to the end of the chunklist (as we would normally do in the absence of linear advertisements), the appending module 128 of computer system 101 appends the corresponding linear advertisement media chunk entry 127 (or entries) to the chunklist.

If the buffering position is at the live position, then a full chunk download commences immediately. In essence, the linear advertisement chunk publishing schedule is clocked by the main content chunk publishing schedule. This technique also allows the media player 106 to continue to receive updates which are carried along with main content chunk publishing, such as the timestamp of the next main content chunk (so that full manifest download may be avoided), and the availability of new chunks in sparse streams (such as subtitles/captions, advertising, etc.) which are linked to the main content stream (typically video content). In order to subscribe to updates in main content, a separate list (or at the very least, the last published main content chunk) is maintained to remember the update position, so that the presence of a new chunk can be detected. These concepts will be explained further below with regard to methods 200, 300 and 400 of FIGS. 2, 3 and 4, respectively.

Figure 2:
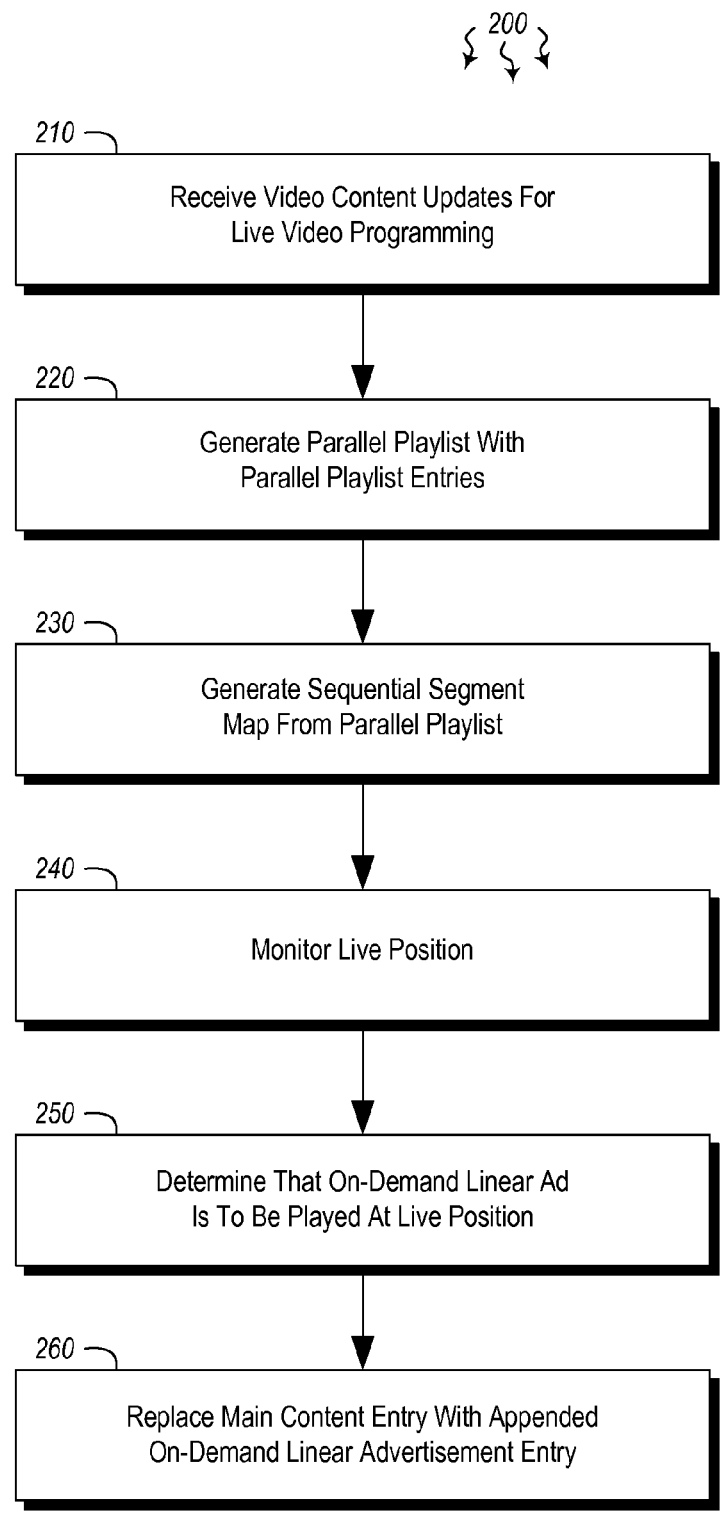
FIG. 2 illustrates a flowchart of an example method for pacing on-demand linear advertisement entries to appear as being live entries.
Figure 3:
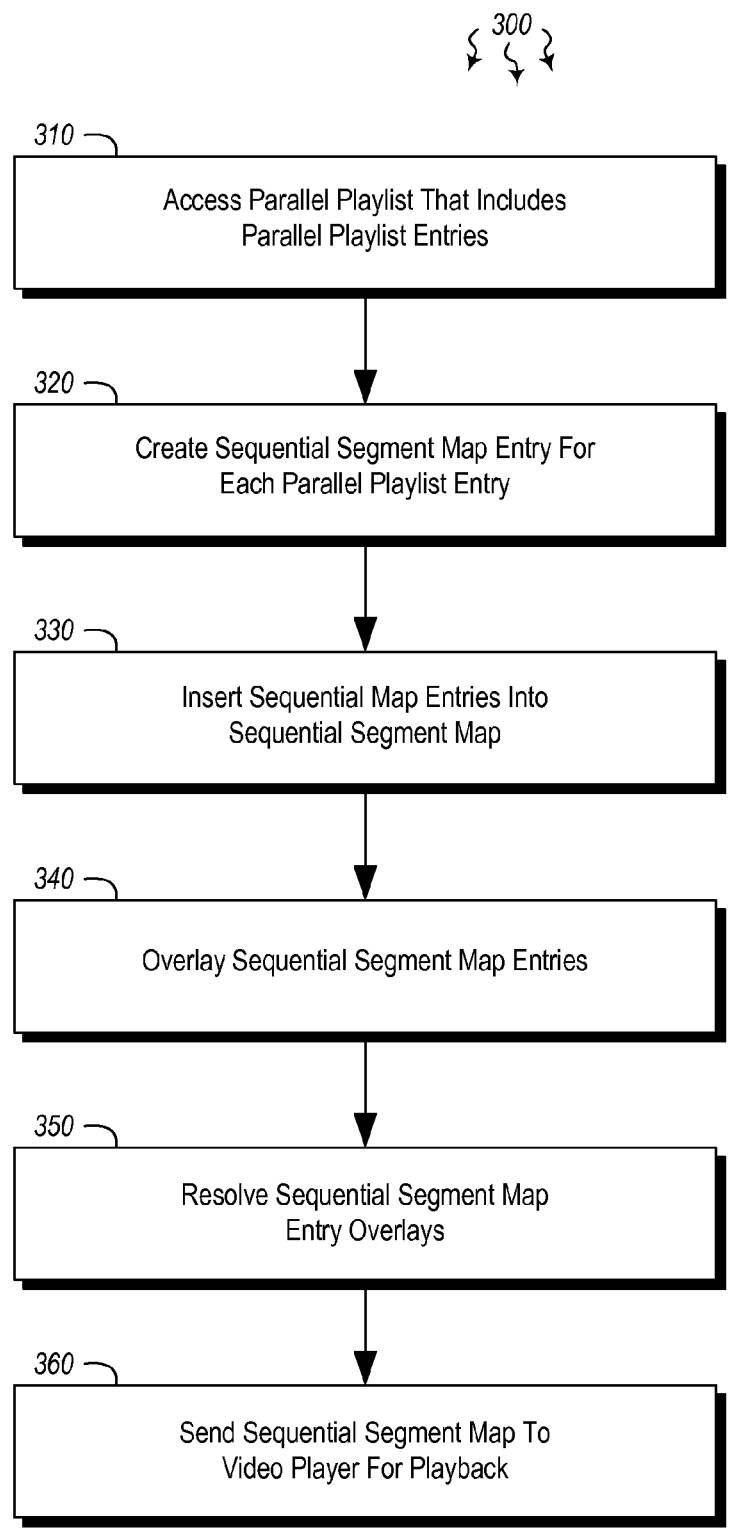
FIG. 3 illustrates a flowchart of an example method for generating a sequential segment map from a parallel playlist.
Figure 4:
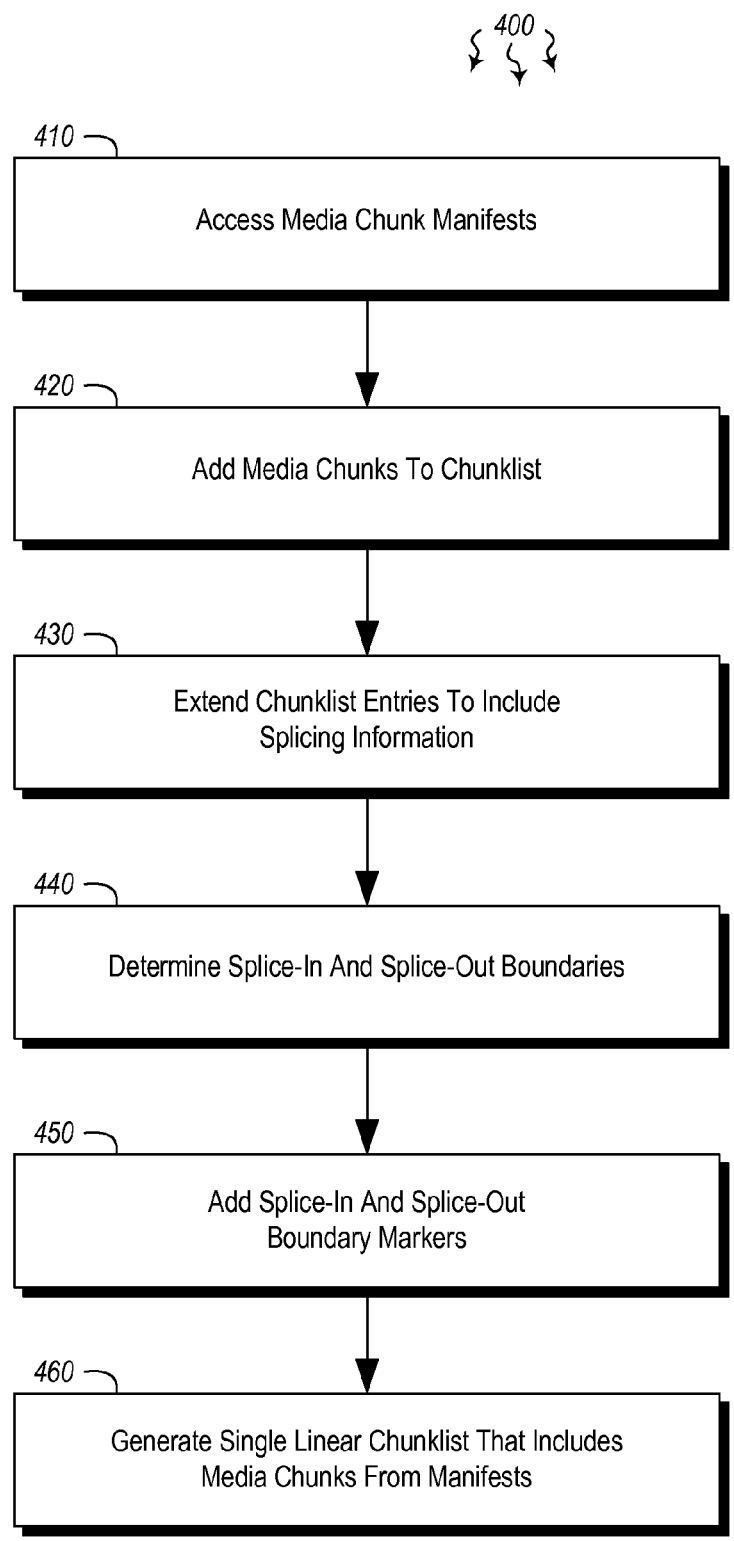
FIG. 4 illustrates a flowchart of an example method for consolidating linear ad and main content portions into a single linear chunklist.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for pacing on-demand linear advertisement entries to appear as being live entries. The method 200 will now be described with frequent reference to the components and data of environment 100.

Method 200 includes an act of receiving video content updates for a portion of live video programming, the live video programming including both main content entries and on-demand linear advertisement entries that are played according to an advertising schedule (act 210). For example, receiving module 110 of computer system 101 may receive live video programming 125 which includes main content entries 126 and on-demand linear advertisement entries 127. The main content may be video, audio, video and audio or other programming provided by main content programming source 130, and typically includes the portion of content the user desires to watch (such as a television program or movie). The on-demand linear ads 127 include advertisements such as television commercials, but may also include flash advertisements, popups or other common advertisement mechanisms used for online video. The linear advertisements may be provided by a separate source (i.e. linear advertisement source 131). Additionally or alternatively, the main content entries and/or the on-demand linear advertisements may come from other content sources 132.

As explained above, when main content and on-demand linear advertisements are played by a media player (e.g. 106), they are played according to Z-order, as outlined in FIG. 6A. Content that is higher in the Z-order is preferred over (and overwrites) the content of lower levels. Thus, advertisement-level content 614 is played over the main content 615. Accordingly, when linear advertisements are to be played, they supplant the existing main content 615. This will be discussed further below with regard to method 300 of FIG. 3.

Method 200 further includes an act of generating a parallel playlist that includes one or more parallel playlist entries, each parallel playlist entry identifying a presentation that is to be played at a specified point on a linear timeline, the presentation including at least one of a main content entry and an on-demand advertisement entry (act 220). Parallel playlist generating module 115 of computer system 101 may be used to generate the parallel playlist 114. The parallel playlist 114 includes playlist entry 116 that itself includes presentation 117. A presentation identifies content that is to be played at a specified point in the linear timeline 111. The presentation includes or identifies a main content entry 118 (which may include all or a portion of main content entries 126) and an on-demand advertisement entry 119 (which may include all or a portion of on-demand linear advertisement entries 127).

Using the parallel playlist 114, the sequential segment map generating module 120 may generate a sequential segment map 121. The sequential segment map 121 may identify which parallel playlist entry 123 is to be played at the current point in the linear timeline (act 230). The computer system 101 then monitors a live position to determine that at least one new portion of main content media has been become available (act 240), determines that an on-demand linear advertisement is to be played at the live position (act 250), and appends one or more corresponding on-demand linear advertisement chunks 135 to a chunklist 133 to replace the main content chunks 134. As such, the on-demand linear advertisement entries are played in a pseudo-live format as if they were live. Specifically, the appended on-demand linear advertisement entries 127A are played in a pseudo-live format within the updated video programming 125U.

In some cases, computer system 101 may determine that the buffering position for the linear timeline 111 is currently at the live position. As such, the computer system may automatically initiate a download of each of the parallel playlist entries 116. From there, the playlist entries may be converted into sequential segment maps that define how the video programming is to be played back. In some cases, the on-demand linear advertisement entries may be scheduled on a per-user level. Thus, the on-demand linear ads 127 may be delivered to the user 105 and may be targeted specifically for that user. The parallel playlist 114 and sequential segment map 121 ensure that the proper, user-specific advertisement is delivered to the user when advertisements are to be shown. These on-demand linear advertisement entries 127 appear to the user as being main content entries 126, and can be rewound and fast forwarded through as if they were main content. As such, the user may remain unaware that the on-demand linear advertisement entries originated from a media source that is different than the source for the main content entries.

In some cases, errors may occur when attempting to play on-demand linear advertisements. The errors may occur due to any number of different simple or complex problems. If the computer system 101 determines that the on-demand linear advertisement entries are malfunctioning in any way, it may save the main content entries to a data store for recovery (i.e. saved main content entries 126A). It may then play the saved main content entries 126A instead of the on-demand linear advertisement entries 127. This allows the system 100 to seamlessly recover from malfunctions.

FIG. 3 illustrates a flowchart of a method 300 for generating a sequential segment map from a parallel playlist. The method 300 will now be described with frequent reference to the components and data of environments 100 and 500 of FIGS. 1 and 5, respectively.

Method 300 includes an act of accessing a parallel playlist that includes a plurality of parallel playlist entries, the parallel playlist entries identifying a presentation that is to be played at a specified point on a programming timeline, the parallel playlist entries being ordered in increasing priority (act 310). As explained above, parallel playlist 114 includes at least parallel playlist entry 116 (among potentially any number of other parallel playlist entries). Each parallel playlist entry identifies a presentation 117 that is to be played at a specified point in programming timeline 111. Each playlist entry is ordered in increasing priority, and each playlist may, itself, include other parallel playlists. As such, parallel playlist entries may be recursive.

Method 300 further includes an act of creating a sequential segment map entry for each parallel playlist entry, wherein each parallel playlist entry is scheduled to play at a specified time indicated on a linear insertion timestamp for a specified duration (act 320). The sequential segment map generating module 120 may generate sequential map 121 with one or more sequential segment map entries 122. Each sequential segment map entry 122 includes, for each particular parallel playlist entry 123, a linear insertion timestamp 124 indicating when the linear advertisement is to be played, and a playback declaration 125 indicating how long the linear advertisement is to be played.

The programming portions are arranged in increasing priority (i.e. Z-order). Thus, as shown in FIG. 6A, parallel playlist 611 includes main content 615 as the lowest priority. Next in priority is the advertisement level 614. If a user-specific ad is to be inserted, it will take precedence over (and thus overwrite) any national ads or any main content. Thus, advertisers can indicate the priority their user-specific ad is to take and it will be arranged in the parallel playlist as such.

Method 300 further includes an act of inserting each sequential map entry into a sequential segment map according to the sequential segment map entry's associated linear insertion timestamp (act 330). Thus, sequential segment map entries are arranged within the sequential segment map according to timestamps. At this point, the computer system 101 overlays the sequential segment map entries 122 on top of the existing sequential segment map entries in the sequential segment map 121 to determine where overlaps exist between sequential segment map entries (act 340). The computer system then resolves any determined sequential segment map entry overlaps to ensure that a single parallel playlist entry is played at the specified time indicated on the linear insertion timestamp 124 (act 350), and sends the sequential segment map to a video player 106 for playback according to the insertion order of the sequential map entries (act 360). Accordingly, the sequential segment map 121 specifies, for any given point in time, which video portions to play, starting where and for how long. Some media players can play content directly from the sequential segment map. Other media players play from chunk lists, as will be explained below with regard to FIGS. 4 and 5. It should also be noted that on-demand linear advertisements may also be inserted in real-time at the live position, allowing the on-demand linear advertisements to be inserted past the current live position, but not be made visible until the live position reaches the advertisement insertion time.

In some embodiments, conflicts may arise as to which content (main or advertising) is to be played. In such cases, the computer system 101 may access an empty sequential segment map, which represents a linear timeline for each parallel playlist entry 116 in the parallel playlist 114, may create a sequential segment map entry 122 which states that a given manifest, starting at a specified manifest time, will be played at a particular linear timestamp 124, for a specified duration. The computer system may then perform an ordered, sorted insertion of at least one sequential segment map entry 122 into the sequential segment map 121, and upon determining that adjacent sequential segment map entries overlap with the sequential segment map entry currently being added, may resolve the conflict in favor of the higher priority entry, so that the higher priority entry overwrites any lower priority entries. In cases where a new sequential segment entry spans another entry in its entirety, the spanned entry is removed completely.

FIG. 4 illustrates a flowchart of a method 400 for consolidating linear ad and main content portions into a single linear chunklist. The method 400 will now be described with frequent reference to the components and data of environments 100 and 500 of FIGS. 1 and 5, respectively.

Method 400 includes an act of accessing a media chunk manifest which describes how to download one or more media chunks for playback, the media chunks including at least one of main content chunks and linear advertisement chunks (act 410). Thus, accessing module 505 of computer system 501 may access a media chunk manifest 506 which describes how to download media chunks 525 for playback. The media chunks 525 may include main content chunks 523 and/or linear advertisement chunks 524 from any of the media chunk sources 520 (i.e. main content source 521 or linear advertisement source 522).

The computer system 501 may then add one or more media chunks 525 from the media chunk manifests 506 to a chunklist 511, such that main content media chunks are overwritten 513 by the new media chunks 512 upon determining that a linear advertisement is to be played at that time (act 420). Each chunklist entry 514 may be extended to include its own splice-in 515 and splice-out information 516 (act 430). The computer system 501 determines a splice-in boundary 515B and a splice-out boundary 516B for a linear advertisement that is to be inserted into the chunklist 511 (act 440). The appending module 510 of computer system 501 then adds a splice-in boundary marker 515A to the splice-in boundary 515B and a splice-out boundary marker 516A to the splice-out boundary 516B (act 450). Then, a single linear chunklist 526 is generated that includes one or more media chunks 525 from a plurality of different manifests 506, such that the single linear chunklist is playable by a media player 506 using the boundary markers to determine where to splice the advertisement in (act 460). The media player 506 may then play the media chunks to the user 505 as outlined in the single linear chunklist 526.

The computer system 501 may further determine that one or more linear advertisements have been inserted into the single linear chunklist 526 while playback is in progress. If such is the case, the computer system may determine that the inserted linear advertisements overlap with the current buffering position, and may abort buffering and flush the overlapped portion of the single linear chunklist. Additionally or alternatively, the media player may be reset to download from the inserted linear advertisement (e.g. new media chunk 512), may determine that the inserted linear advertisement overlaps with the current playback position, and may seek to a current position to flush any stale media chunks. In this manner, different media player platforms may be supported, including those that support playback from sequential segment maps, and those that only support playback from chunk lists.

Accordingly, methods, systems and computer program products are provided which pace on-demand linear advertisement entries to appear as being live entries. Moreover, methods, systems and computer program products are provided which generate sequential segment maps from parallel playlists and which consolidate linear ad and main content portions into a single linear chunklist.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:
1. A computer system comprising:
one or more computer-readable storage media having stored thereon computer-executable instructions;
one or more processors which, when executing the computer-executable instructions, cause a system architecture to perform a computer-implemented method for pacing on demand linear advertisement entries to appear as though they are live entries, and wherein the computer-implemented method performed by the system architecture comprises acts of:
receiving video content updates for a portion of live video programming, the live video programming including both main content entries and on-demand linear advertisement entries that are played according to an advertising schedule;
generating a parallel playlist that includes at least one parallel playlist entry, the parallel playlist entry identifying a presentation that is to be played at a specified point on a linear timeline, and the presentation including at least one of a main content entry and an on-demand advertisement entry;
generating a sequential segment map from the parallel playlist, the sequential segment map identifying that the at least one parallel playlist entry is to be played at a current point in the linear timeline, wherein the sequential segment map is generated by creating a sequential segment map entry for the at least one parallel playlist entry, and the sequential segment map entry comprising a linear insertion timestamp indicating when the on-demand advertisement entry is to be played, and a playback declaration indicating how long the on-demand advertisement is to be played;
overlaying the sequential segment map entry on top of an existing sequential segment map entry in the sequential segment map to determine if overlap exists between the sequential segment map entry for the at least one parallel playlist entry and the existing sequential segment map entry, and if so, resolving the conflict in favor of a higher priority entry by causing the higher priority entry to overwrite any lower priority entry;
monitoring a live position to determine that at least one new portion of main content media has become available;
determining that an on-demand linear advertisement is to be played at the live position; and
appending one or more corresponding on-demand linear advertisement chunks to a chunklist to replace main content chunks, such that the on-demand linear advertisement entries are played in a pseudo-live format as if they were live.

2. The computer system of claim 1, wherein the implemented method further comprises an act of resolving the sequential segment map into a chunklist.

3. The computer system of claim 1, wherein the implemented method further comprises an act of receiving one or more updates which are transmitted along with the main content chunks.

4. The computer system of claim 1, wherein the parallel playlist entries are ordered in increasing priority.

5. The computer system of claim 1, wherein the implemented method further comprises:
- an act of determining that the buffering position for the linear timeline is currently at the live position; and
- an act of initiating a download of each of the parallel playlist entries.

6. The computer system of claim 1, wherein the on-demand linear advertisement entries are scheduled on a per-user level.

7. The computer system of claim 1, wherein a single chunklist is used to represent both the main content entries and the on-demand linear advertisement entries.

8. The computer system of claim 1, wherein the implemented method further comprises:
- an act of determining that the on-demand linear advertisement entries are malfunctioning;
- an act of saving the main content entries to a data store for recovery; and
- an act of playing the saved main content entries instead of the on-demand linear advertisement entries to recover from the malfunction.

9. The computer system of claim 1, wherein the on-demand linear advertisement entries appear as being main content entries, and can be rewound and fast forwarded through, such that viewers remain unaware that the on-demand linear advertisement entries originated from a media source that is different than the source for the main content entries.

10. A computer system comprising:
- one or more computer-readable storage media having stored thereon computer-executable instructions;
- one or more processors which, when executing the computer-executable instructions, cause a system architecture to perform a computer-implemented method for pacing on demand linear advertisement entries to appear as though they are live entries, and wherein the computer-implemented method performed by the system architecture comprises acts of:
  - receiving video content updates for a portion of live video programming, the live video programming including both main content entries and on-demand linear advertisement entries that are played according to an advertising schedule;
  - generating a parallel playlist that includes parallel playlist entries, each parallel playlist entry identifying a presentation that is to be played at a specified point on a linear timeline, and the presentation including an on-demand advertisement entry, and wherein the parallel playlist entries are ordered in increasing priority;
  - generating a sequential segment map from the parallel playlist, the sequential segment map identifying for each parallel playlist entry that the parallel playlist entry is to be played at particular point in the linear timeline, wherein the sequential segment map is generated by creating a sequential segment map entry for each parallel playlist entry, and each sequential segment map entry comprising a linear insertion timestamp indicating when the on-demand advertisement entry for a given parallel playlist entry is to be played, and a playback declaration indicating how long the on-demand advertisement entry is to be played;
  - overlaying the sequential segment map entry on top of an existing sequential segment map entries in the sequential segment map to determine if overlap exists between the sequential segment map entry for any of the parallel playlist entries and the existing sequential segment map entries, and if so, resolving the conflict in favor of a higher priority entry by causing the higher priority entry to overwrite any lower priority entry, wherein resolving the conflict ensures that a single parallel playlist entry is played at the specified time indicated on the linear insertion timestamp; and
  - performing one of the following, depending on whether a video player is able to play content directly from a sequential segment map:
    - if the video player is able to play content directly from a sequential segment map, sending the sequential segment map to the video player for playback according to the resolved insertion order of the sequential map entries; or
    - if the video player is unable to play content directly from a sequential segment map, then generating a single linear chunklist that consolidates one or more on-demand advertisement entries with main content portions of media and sending the single linear chunklist to the video player that is unable to play content directly from a sequential segment map.

11. The computer system of claim 10, wherein each parallel playlist entry in the parallel playlist is itself a parallel playlist.

12. The computer system of claim 10, wherein the implemented method further comprises:
- an act of accessing an empty sequential segment map, which represents a linear timeline;
- for each parallel playlist entry in the parallel playlist, an act of creating a sequential segment map entry which states that a given manifest, starting at a specified manifest time, will be played at a particular linear timestamp, for a specified duration;
- an act of performing an ordered, sorted insertion of at least one sequential segment map entry into the sequential segment map; and
- upon determining that adjacent sequential segment map entries overlap with the sequential segment map entry currently being added, an act of resolving the conflict in favor of the higher priority entry such that the higher priority entry overwrites any lower priority entries.

13. The computer system of claim 10, wherein one or more on-demand linear advertisements are inserted in real-time at the live position, allowing the on-demand linear advertisements to be inserted past the current live position, but not be made visible until the live position reaches the advertisement insertion time.

14. The computer system of claim 10, wherein one or more on-demand linear advertisements are inserted into live, internet streaming content.

15. The computer system of claim 10, wherein generating the single linear chunklist that consolidates one or more on-demand advertisement entries with main content portions of media comprises acts of:
- accessing a media chunk manifest which describes how to download one or more media chunks for playback, the media chunks including at least one of main content chunks and linear advertisement chunks;

adding one or more media chunks from the media chunk manifests to a chunklist, such that main content media chunks are overwritten upon determining that a an on-demand advertisement entry is to be played at that time;

extending each chunklist entry to include its own splice-in and splice-out information;

determining a splice-in boundary and a splice-out boundary for an on-demand advertisement entry that is to be inserted into the chunklist; and adding a splice-in boundary marker to the splice-in boundary and a splice-out boundary marker to the splice-out boundary.

16. The computer system of claim 15, wherein the implemented method further comprises an act of playing the single linear chunklist on the media player.

17. The computer system of claim 15, wherein the implemented method further comprises:
an act of determining that one or more linear advertisements have been inserted into the single linear chunklist while playback is in progress; and
an act of determining that the inserted linear advertisements overlap with the current buffering position; and
an act of aborting buffering and flushing the overlapped portion of the single linear chunklist.

18. The computer system of claim 17, wherein the implemented method further comprises:
an act of resetting the media player to download from the inserted linear advertisement;
an act of determining that the inserted linear advertisement overlaps with the current playback position; and
an act of seeking to a current position to flush stale media chunks.

19. A computer system comprising:
one or more computer-readable storage media having stored thereon computer-executable instructions;
one or more processors which, when executing the computer-executable instructions, cause the computing system to operate a system architecture for implementing a method for pacing on demand linear advertisement entries to appear as though they are live entries, and wherein the system architecture operates by performing the following:
receiving at a receiving module video content updates for a portion of live video programming, the live video programming including both main content entries and on-demand linear advertisement entries that are played according to an advertising schedule;
generating at a parallel playlist generating module a parallel playlist that includes at least one parallel playlist entry, the parallel playlist entry identifying a presentation that is to be played at a specified point on a linear timeline, and the presentation including at least one of a main content entry and an on-demand advertisement entry;
generating at a sequential segment map generating module a sequential segment map from the parallel playlist, the sequential segment map identifying that the at least one parallel playlist entry is to be played at a current point in the linear timeline, wherein the sequential segment map is generated by creating a sequential segment map entry for the at least one parallel playlist entry, and the sequential segment map entry comprising a linear insertion timestamp indicating when the on-demand advertisement entry is to be played, and a playback declaration indicating how long the on-demand advertisement is to be played;
overlaying the sequential segment map entry on top of an existing sequential segment map entry in the sequential segment map to determine if overlap exists between the sequential segment map entry for the at least one parallel playlist entry and the existing sequential segment map entry, and if so, resolving the conflict in favor of a higher priority entry by causing the higher priority entry to overwrite any lower priority entry;
monitoring at a monitoring module a live position to determine that at least one new portion of main content media has become available;
determining that an on-demand linear advertisement is to be played at the live position; and
appending at an appending module one or more corresponding on-demand linear advertisement chunks to a chunklist to replace main content chunks, such that the on-demand linear advertisement entries are played in a pseudo-live format as if they were live.

20. The computer system of claim 19, wherein the on-demand linear advertisement entries appear as being main content entries, and can be rewound and fast forwarded through, such that viewers remain unaware that the on-demand linear advertisement entries originated from a media source that is different than the source for the main content entries.

* * * * *